Feb. 23, 1926.
J. A. MAREK
1,574,670
PLOW ATTACHMENT FOR TRACTORS
Filed Oct. 10, 1924    2 Sheets-Sheet 1
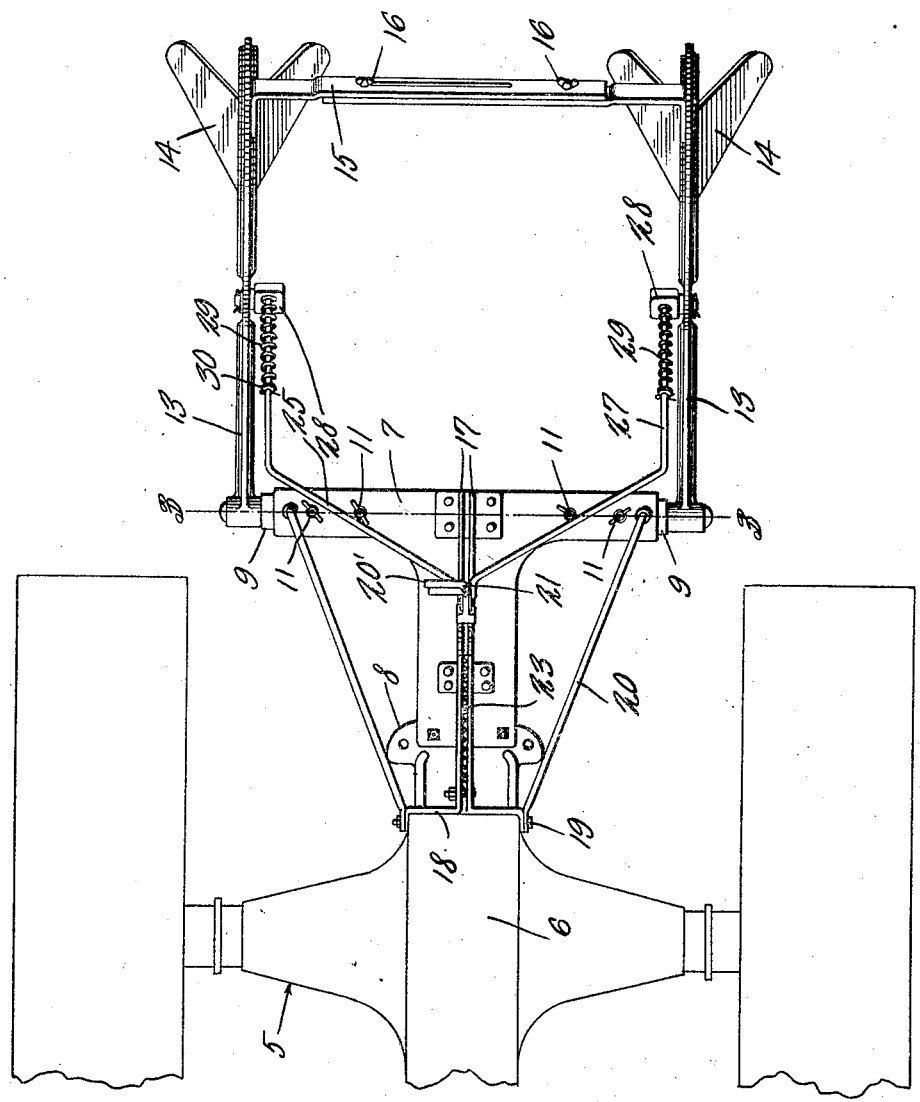

Feb. 23, 1926.
J. A. MAREK
1,574,670
PLOW ATTACHMENT FOR TRACTORS
Filed Oct. 10, 1924  2 Sheets-Sheet 2
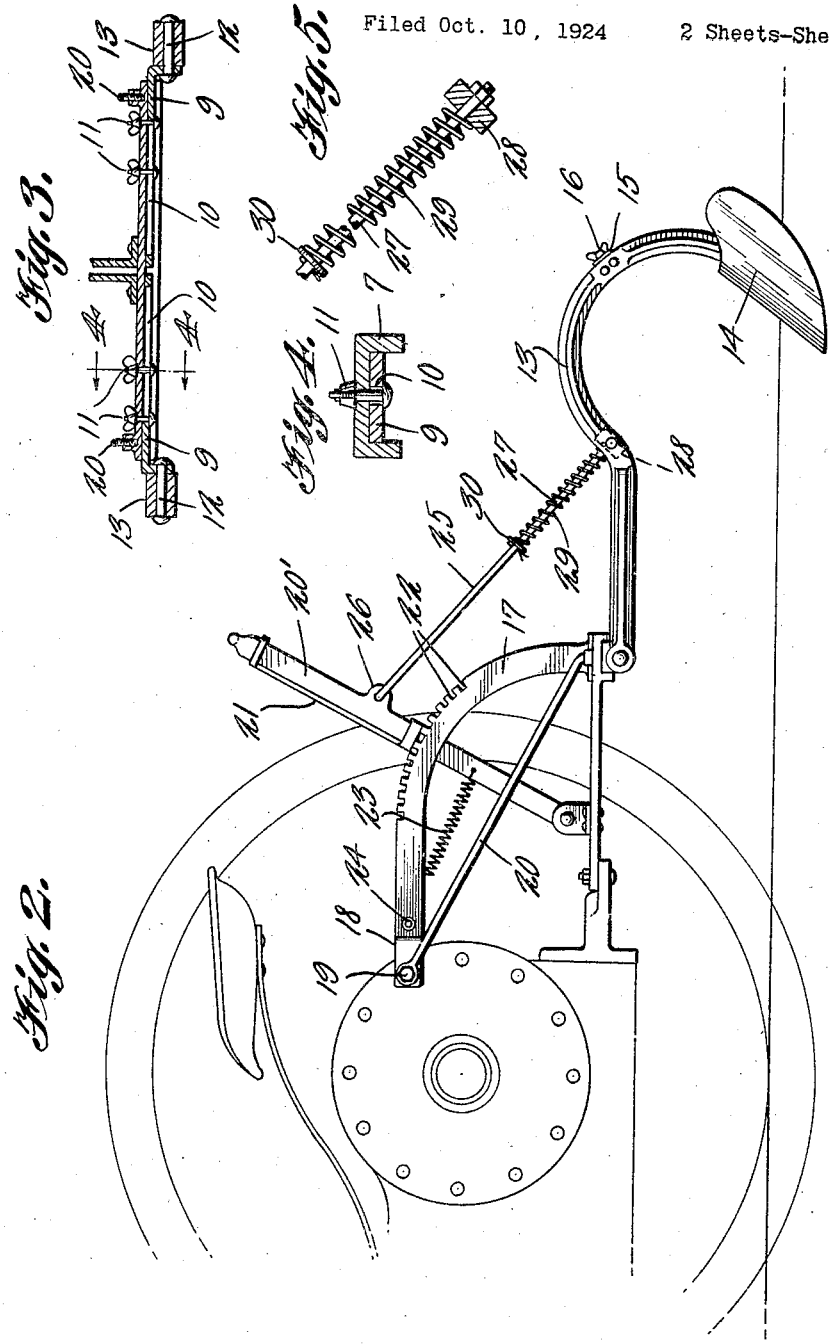
J. A. Marek,
INVENTOR
BY Victor J. Evans
ATTORNEY Patented Feb. 23, 1926.

1,574,670

UNITED STATES PATENT OFFICE.

JOHN A. MAREK, OF YOAKUM, TEXAS.

PLOW ATTACHMENT FOR TRACTORS.

Application filed October 10, 1924. Serial No. 742,907.

*To all whom it may concern:*

Be it known that I, JOHN A. MAREK, a citizen of the United States, residing at Yoakum, in the county of Lavaca and State of Texas, have invented new and useful Improvements in Plow Attachments for Tractors, of which the following is a specification.

My invention relates to plow attachments for tractors and its principal object is to provide a plow or cultivator attachment for tractors embodying a plurality of earth breaking elements which can be adjusted rapidly with respect to each other to engage the ground at predetermined points.

A further object of the invention is to provide a plow attachment for tractors embodying a frame to be associated with the tractor and which is provided with manually operable means whereby either one of the plow shares or earth breaking elements may be adjusted transversely of the tractor and which when not in use may be manually raised to an elevated position.

Still another object of the invention is to provide a plow attachment for tractors embodying pivoted plow shares which are resiliently supported so that in the event that either of the plow shares strike a hard surface bending or breaking of the plow beams will be prevented. The invention also contemplates an attachment for tractors which is provided with a novel draft means that can be readily associated with a differential housing of a tractor of well known make.

With the preceding and other objects and advantages in mind, the invention consists in the novel combination of elements, construction and arrangement of parts and operation to be hereinafter specifically referred to, claimed and illustrated in the accompanying drawings, wherein:—

Figure 1 is a top plan view of a tractor with the plow attachment associated therewith.

Figure 2 is a side elevation of the same.

Figure 3 is a horizontal sectional view taken on line 3—3 of Figure 1.

Figure 4 is a transverse sectional view taken on line 4—4 of Figure 3, and

Figure 5 is a fragmentary detail view showing the resilient connection between one of the plow beams and the elevating lever.

Referring to the drawings in detail wherein corresponding characters of reference denote corresponding parts throughout the several views, the numeral 5 designates a tractor of a well known type and 6 the differential housing therefor.

My attachment comprises a channel shaped bar 7 provided with a forwardly extending tongue which is detachably connected with the draw bar 8 of the tractor. Angle plates 9 are longitudinally adjustable in the channel shaped bar 7 and are provided with longitudinal slots 10. Fastenings 11 extend through the slots 10 and the channel shaped bar 7 and receive wing nuts 11 upon their upper ends whereby the angle plates 9 are held in adjusted position. Laterally extending pins 12 project from the vertical legs of the angle brackets 9 as shown in Figure 3 and pivotally mounted on these pins 12 are plow beams 13 carrying plow shares or other earth breaking elements 14 upon their lower ends. Overlapping brace bars 15 are cast with the rear ends of the beams 13 and are adjustably connected together by means of slot and bolt connections 16.

A pair of spaced parallel longitudinally curved bars 17 have their lower ends secured to the channel bar 7 and their upper ends formed with angular extensions which together provide a U-shaped seat or saddle 18 which embraces the differential housing 6 and is secured thereto by means of a bolt 19 passing transversely through this housing. Brace rods 20 are secured to the ends of this bolt 19 and extend rearwardly at an angle and are secured to the channel shaped bar 7 adjacent its ends.

A hand lever 20 is pivotally mounted upon the tongue 6 and is movable between the spaced bars 17. A reciprocable detent 21 is carried by this lever 20 and is adapted to engage with the teeth of the serrations 22 provided on these bars 17 at their crest. A contractile spring 23 has one end connected with the lever 20 and its opposite end connected with the forward ends of the bars 19 as indicated at 24 and normally urges the lever 20 in a forward direction. A V-shaped yoke is designated at 25 and has its apex pivotally connected with the lever 20 as indicated at 26 and terminates in parallel legs 27 slidably received through perforated ears 28 extending laterally through the inner faces of the plow beams 13. Expansible coil springs 29 encircle these parallel legs 27 and have their lower ends bearing against the perforated ears 28 and their upper ends engageable with abutments 30 fixed on these legs 27.

With my improved plow attachment it will be observed that the plow shares may be adjusted toward or away from each other to plow or furrow the ground at predetermined points. It will also be observed that when not in use, the plow beams may be raised to elevate the plow shares by means of the lever 20 and connections between the same and the beams 13. In this connection it will be seen that the coil spring 29 will permit the plow share to yield against the action of the springs in the event that the plow share strikes a hard surface or obstruction.

While I have shown and described the preferred embodiment of the invention, it is to be understood that changes in arrangement of parts may be made, and that I am only limited by the appended claims.

Having thus described the invention, I claim:

1. The combination with a tractor, of a transverse bar detachably associated with the tractor, earth breaking elements pivotally connected with the transverse bar and extending rearwardly therefrom, a quadrant carried by the bar, a U-shaped seat carried by the upper end thereof, and adapted to embrace the differential housing of the tractor, a bolt passing through the housing and the seat, and a lever cooperating with the quadrant and operatively connected with the earth breaking elements.

2. A tractor attachment comprising a transverse bar, plates associated with the bar for longitudinal movement toward and away from each other, a plow beam pivotally connected with each of the plates, overlapping bars carried by the beams, and adjustably connected together, means for connecting the transverse bar to the tractor, a pivoted lever, a V-shaped yoke pivotally connected with the lever and including parallel legs, perforated ears extending laterally from the plow shares and slidably receiving the legs, and contractile springs encircling the legs for engaging the perforated ears, abutments on the legs with which the upper ends of the springs abut, the springs permitting the plow beams to yield upon striking an attachment.

3. A plow attachment for tractors comprising a channel shaped bar, a tongue extending forwardly therefrom for connection to the tractor, angle brackets adjustable in the channel of the bar, laterally extending pins projecting from the angle brackets, plow beams pivotally secured to the laterally extending pins, plows on the beams, and means for adjusting the plow beams in a vertical plane.

JOHN A. MAREK.